(12) United States Patent
Babcanec et al.

(10) Patent No.: US 9,216,561 B2
(45) Date of Patent: Dec. 22, 2015

(54) METHODS AND ASSEMBLIES FOR WELDING A GASKET TO A PIPE SECTION

(71) Applicant: Advanced Drainage Systems, Inc., Hilliard, OH (US)

(72) Inventors: Joseph A. Babcanec, Hilliard, OH (US); Bill R. Vanhoose, Hilliard, OH (US); Nicholas J. Piazza, Findlay, OH (US)

(73) Assignee: Advanced Drainage Systems, Inc., Hilliard, OH (US)

(*) Notice: Subject to any disclaimer, the term of this patent is extended or adjusted under 35 U.S.C. 154(b) by 470 days.

(21) Appl. No.: 13/722,151

(22) Filed: Dec. 20, 2012

(65) Prior Publication Data
US 2014/0174653 A1    Jun. 26, 2014

(51) Int. Cl.
*B32B 37/00* (2006.01)
*B32B 37/16* (2006.01)
*F16J 15/10* (2006.01)
(Continued)

(52) U.S. Cl.
CPC ............... *B32B 37/16* (2013.01); *B29C 65/02* (2013.01); *B29C 65/10* (2013.01); *B29C 66/12449* (2013.01); *B29C 66/12461* (2013.01); *B29C 66/12463* (2013.01); *B29C 66/12469* (2013.01); *B29C 66/534* (2013.01); *B29C 66/5324* (2013.01); *B29C 66/5344* (2013.01); *B29C 66/65* (2013.01); *B29C 66/652* (2013.01); *B29C 66/81423* (2013.01); *B29C 66/81431* (2013.01); *B29C 66/81465* (2013.01); *B29C 66/81469* (2013.01); *B29C 66/8242* (2013.01); *B29C 66/8362* (2013.01); *B29C 66/83411* (2013.01); *B29C 66/8432* (2013.01); *B29C 66/861* (2013.01); *B29C 66/86535* (2013.01); *F16J 15/061* (2013.01); *F16J 15/10* (2013.01); *F16J 15/108* (2013.01); *F16L 25/0054* (2013.01); *F16L 47/10* (2013.01); *B29C 65/08* (2013.01); *B29C 65/18* (2013.01); *B29C 65/40* (2013.01); *B29C 65/4815* (2013.01); *B29C 66/30321* (2013.01); *B29C 66/5221* (2013.01); *B29C 66/55* (2013.01); *B29C 66/71* (2013.01); *B29C 66/7252* (2013.01); *B29C 66/8414* (2013.01); *B29C 66/919* (2013.01); *B29C 66/9141* (2013.01); *B29C 66/91411* (2013.01);
(Continued)

(58) Field of Classification Search
CPC .. B29C 65/10; B29C 66/534; B29C 66/5344; B29C 66/81423; B29C 66/81431; F16J 15/061; F16L 25/0054
USPC .................................................. 156/82, 293
See application file for complete search history.

(56) References Cited

U.S. PATENT DOCUMENTS

| 5,096,528 A   | * | 3/1992 | Durrenberger et al. ........ 156/211 |
| 8,109,540 B2  | * | 2/2012 | Zepp et al. .................... 285/374 |
| 2013/0140811 A1 | * | 6/2013 | Fahrer et al. ............... 285/285.1 |

*Primary Examiner* — James Sells
(74) *Attorney, Agent, or Firm* — Finnegan, Henderson, Farabow, Garrett & Dunner LLP (57) ABSTRACT

The present disclosure is directed to a method of welding a gasket to a spigot portion of a pipe section. The method includes supporting the gasket in a recess on the spigot portion of the pipe section. The gasket includes a seating portion and a sealing portion. The sealing portion includes a first shoulder portion and a second shoulder portion. A first bonding portion extends from the first shoulder portion and a second bonding portion extends from the second shoulder portion. The first bonding portion and the second bonding portion are provided to bond the gasket to the spigot portion. The method further includes heating a portion of the gasket and an adjacent surface of the spigot portion and applying a force onto the portion of the gasket following the application of heat to fuse the gasket onto the spigot portion.

16 Claims, 9 Drawing Sheets

(51) Int. Cl.
*B29C 65/10* (2006.01)
*B29C 65/00* (2006.01)
*B29C 65/02* (2006.01)
*F16J 15/06* (2006.01)
*F16L 25/00* (2006.01)
*F16L 47/10* (2006.01)
B29L 23/18 (2006.01)
B29L 31/26 (2006.01)
B29C 65/08 (2006.01)
B29C 65/18 (2006.01)
B29C 65/40 (2006.01)
B29C 65/48 (2006.01)
B29L 23/00 (2006.01)

(52) U.S. Cl.
CPC ....... *B29L 2023/186* (2013.01); *B29L 2023/22* (2013.01); *B29L 2031/265* (2013.01)

METHODS AND ASSEMBLIES FOR WELDING A GASKET TO A PIPE SECTION

FIELD OF THE DISCLOSURE

The present disclosure relates to a gasket, and more particularly, to methods and assemblies for welding a gasket to a pipe section.

BACKGROUND OF THE DISCLOSURE

Corrugated pipe sections are used in the drainage of water-saturated soil in various agricultural, residential, recreational, or civil engineering and construction applications, such as for storm sewers. Traditionally, a drainage pipe was made from clay or concrete, which caused the pipe to be heavy, expensive, and brittle. In order to improve the cost-effectiveness, durability, and ease-of-installation of drainage pipes, it is now common in the art to manufacture them from various materials including various polymers and polymer blends.

Such plastic drainage pipe is generally extruded, molded, and cut to form relatively light, manageable, and transportable sizes of drainage pipe sections, ranging from a few feet to many yards in length. Once these plastic pipe sections are transported to their desired installation location, they are assembled lengthwise by the installation of joints, adhesives, or other coupling means. For example, one method of assembly involves the formation of a wide-diameter bell at one end of each plastic pipe section. The bell is formed such that a spigot on an opposite end of an adjacent pipe section may be inserted into the expanded bell-shaped end. During the pipe manufacturing process, an injection molded gasket is pushed onto the spigot of a pipe section, thereby forming a seal when the spigot is inserted into the bell.

Corrugated pipes used for ground water drainage are subjected to numerous stresses during installation and use that must be accommodated by the gasket disposed between the bell and spigot. For example, a large frictional force is encountered when the spigot and the gasket are inserted into the bell. As the spigot is pushed into the bell, the gasket at times is undesirably pulled from the groove by the large frictional force. When the pipe is not properly sealed, ground water may leak into the pipe or fluid may leak out of the pipe and contaminate the area surrounding the pipe sections.

Additionally and/or alternatively, the joining sections of the corrugated pipe may be exposed to numerous forces causing stress to the gasket during its lifetime. Such stress may allow the gasket to move from its desired location and allow debris to infiltrate the gasket seat. This may reduce the effectiveness of the sealing assembly.

Accordingly, there is a need for methods and assemblies to attach the gasket to the spigot such that the gasket is less likely to be removed from the spigot during handling, storing, shipping, and/or installation.

SUMMARY OF THE DISCLOSURE

One embodiment of the disclosure is directed to a method of welding a gasket to a spigot portion of a pipe section. The method may include supporting the gasket in a recess on the spigot portion of the pipe section. The gasket may include a seating portion and a sealing portion. The seating portion may extend radially and dimensioned to fit within an annular recess in the spigot portion. The sealing portion may include a first shoulder portion axially extending from one side of the seating portion and a second shoulder portion extending from the other side of the seating portion. The first and second shoulder portions may be configured to engage the spigot portion on axially opposite sides. A first bonding portion may extend from the first shoulder portion and a second bonding portion may extend from the second shoulder portion. The first and second bonding portions are provided to bond the gasket to the spigot portion. The method may further include heating a portion of the gasket and an adjacent surface of the spigot portion and applying a force onto the portion of the gasket following the application of heat to fuse the gasket onto the spigot portion.

In various embodiments, the method may include one or more of the following additional features: wherein heating the portion of the gasket and the adjacent surface of the spigot portion includes melting at least the first bonding portion, the second bonding portion, and adjacent surfaces of the spigot portion; wherein the applying force onto the portion of the gasket includes applying one or more compression rollers onto a sealing surface of the sealing portion of the gasket; wherein applying one or more compression rollers includes applying three compression rollers; wherein the gasket is a strip gasket; further including continuously heating the gasket and the spigot portion along a length of the gasket; and further including heating the gasket at various spots along a circumference of the spigot portion.

Another embodiment of the disclosure is directed to a method of manufacturing a pipe assembly. The pipe assembly includes a first corrugated pipe section having a bell portion, a second corrugated pipe section having a spigot portion, and a gasket configured to seal the spigot portion within the bell portion. The method may include supporting the gasket in a recess on the spigot portion of the pipe section. The gasket may include a seating portion and a sealing portion. The seating portion may extend radially and dimensioned to fit within an annular recess in the spigot portion. The sealing portion may include a first shoulder portion axially extending from one side of the seating portion and a second shoulder portion extending from the other side of the seating portion. The first and second shoulder portions being configured to engage the spigot portion on axially opposite sides. A first bonding portion may extend from the first shoulder portion and a second bonding portion may extend from the second shoulder portion. The first bonding portion and the second bonding portion are provided to bond the gasket to the spigot portion. The method may further include directing heat onto a portion of the gasket and an adjacent surface of the spigot portion and applying pressure to the portion of the gasket to fuse the portion of the gasket to the adjacent surface of the spigot portion.

In various embodiments, the method may include one or more of the following additional features: further including providing a welding assembly including one or more blower heads positioned adjacent one or more compression rollers; wherein the one or more blower heads are configured to apply heat to the gasket and spigot portion; wherein the welding assembly includes three compression rollers; wherein the welding assembly is handheld; wherein the welding assembly is automatic; further including rotating the spigot portion while directing heat onto the portion of the gasket; further including melting at least the first bonding portion, the second bonding portion, and adjacent surfaces of the spigot portion; and further including applying pressure to the surface of the gasket immediately following the step of melting the first bonding portion, the second bonding portion, and adjacent surfaces of the spigot portion.

Another embodiment of the disclosure is directed to a gasket for providing a seal between a bell portion of a first corrugated pipe section and a spigot portion of a second corrugated pipe section. The gasket may include a seating portion extending radially and dimensioned to fit within an annular recess in the spigot portion. The gasket may further include a sealing portion including a first shoulder portion axially extending from one side of the seating portion and a second shoulder portion extending from the other side of the seating portion, the first and second shoulder portions being configured to engage the spigot portion on axially opposite sides. A first bonding portion extending from the first shoulder portion and a second bonding portion extending from the second shoulder portion. The first bonding portion and the second bonding portion are configured to bond the gasket to the spigot portion.

In various embodiments, the method may include one or more of the following additional features: wherein the first bonding portion and the second bonding portion are formed of an elastomeric material; wherein the first bonding portion and the second bonding portion are integral with the first shoulder portion and the second shoulder portion, respectively; and wherein the first bonding portion and the second bonding portion each have a surface area sufficient to facilitate bonding of the gasket to the spigot portion.

Additional objects and advantages of the disclosure will be set forth in part in the description that follows, and in part will be obvious from the description, or may be learned by practice of the disclosure. The objects and advantages of the disclosure will be realized and attained by means of the elements and combinations particularly pointed out in the appended claims.

It is to be understood that both the foregoing general description and the following detailed description are exemplary and explanatory only and are not restrictive of the disclosure, as claimed.

The accompanying drawings, which are incorporated in and constitute a part of this specification, illustrate several embodiments of the disclosure and together with the description, serve to explain the principles of the disclosure.

DESCRIPTION OF THE EMBODIMENTS

Reference will now be made in detail to exemplary embodiments of the present disclosure, examples of which are illustrated in the accompanying drawings. Wherever possible, the same reference numbers will be used throughout the drawings to refer to the same or like parts.

Figure 1:
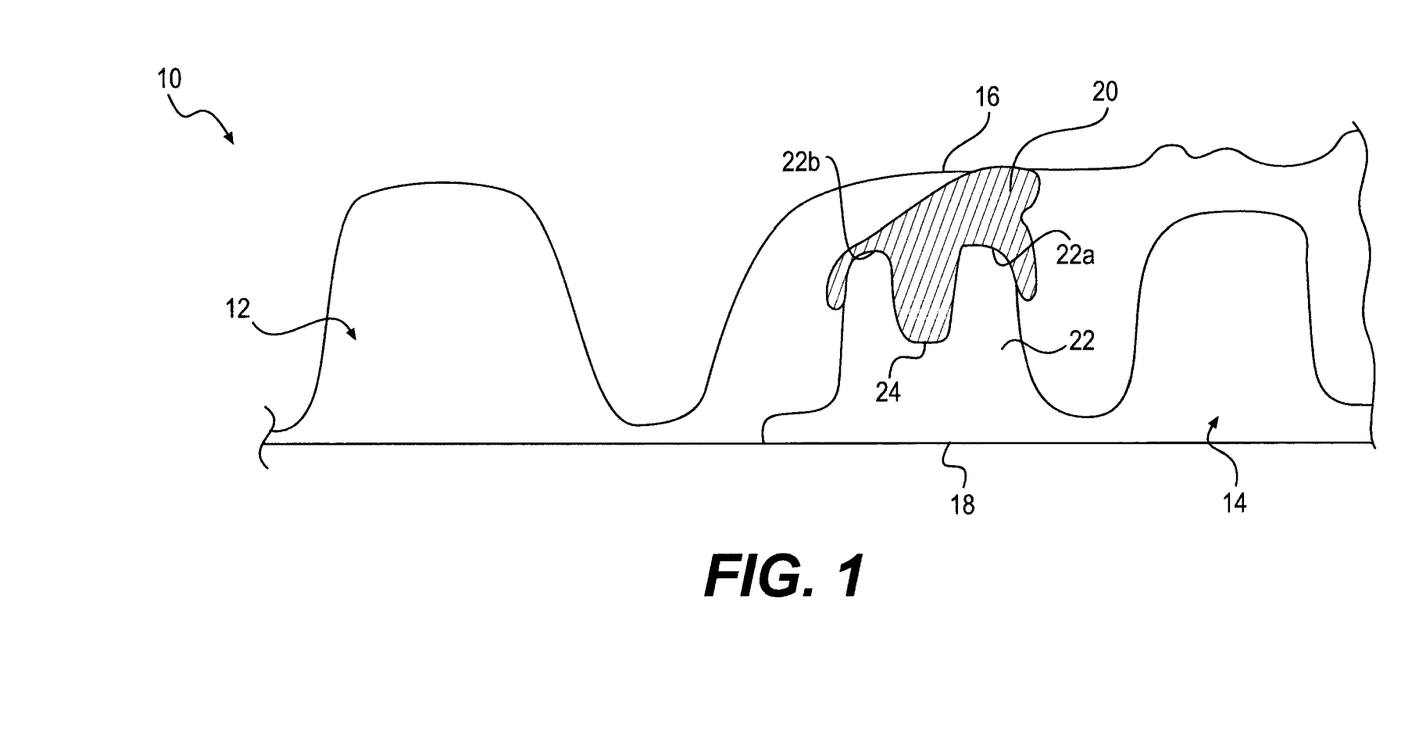
FIG. 1 is a partial, cross-sectional view of an exemplary coupling for joining two sections of a pipe.

FIG. 1 illustrates an exemplary coupling portion 10 for coupling a first corrugated pipe section 12 and a second corrugated pipe section 14. In general, coupling portion 10 includes a bell portion 16 disposed on an end of first corrugated pipe section 12 and a spigot portion 18 disposed on an end of second corrugated pipe section 14. Coupling portion 10 also includes a gasket 20, for retaining and sealing spigot portion 18 within bell portion 16.

Gasket 20 may be a one-piece structure formed of an elastomeric material, such as a thermoplastic elastomeric material or another relatively flexible and elastic material. In at least some embodiments, gasket 20 may be comprised of polyisoprene. Gasket 20 may be formed by any process, such as injection molding or any other suitable process. In some embodiments, gasket 20 may be formed as a strip gasket that is separate from first corrugated pipe section 12 and second corrugated pipe section 14. In other embodiments, gasket 20 may be extruded directly onto spigot portion 18 of second corrugated pipe section 14.

Figure 2:
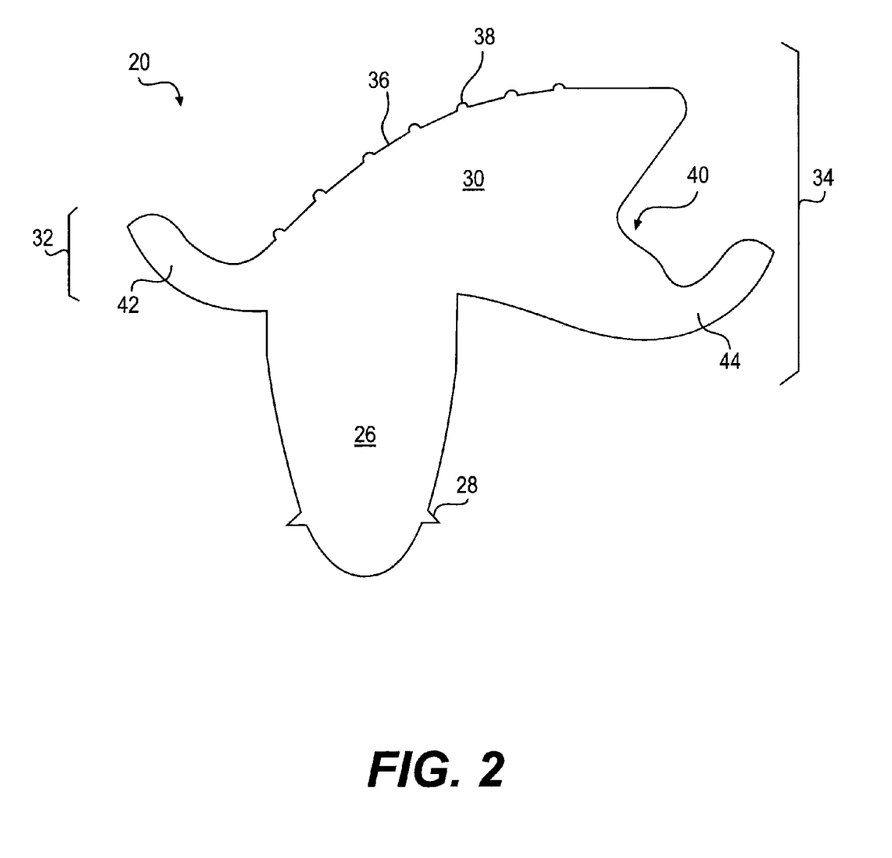
FIG. 2 is a cross-sectional view of an exemplary gasket for use in the coupling of FIG. 1.

Referring to the exemplary gasket depicted in FIG. 2, gasket 20 includes a seating portion 26 and a sealing portion 30. Seating portion 26 may be shaped to fit within a recess 24 of a mini-corrugation 22 or in a recess between corrugations. In some embodiments, seating portion 26 may include one or more protrusions 28 such as, for example, bumps or ridges to facilitate gripping of the seating portion 26 within recess 24 of mini-corrugation 22 of spigot portion 18 (FIG. 1). The shape of gasket 20 and the ratio of the mass of the sealing portion 30 to the seating portion 26 may optimize the sealing ability of gasket 20 while allowing effective seating of gasket 20 for a given overall gasket mass.

Seating portion 26 includes a first shoulder portion 32 and a second shoulder portion 34, and a sealing surface 36 extending between first shoulder portion 32 and second shoulder portion 34. The sealing surface 36 may seal against an interior surface of bell portion 16. In some embodiments, sealing surface 36 may be textured and include one or more protrusions 38 such as, for example, bumps or ridges to retain spigot portion 18 within bell portion 16. First shoulder portion 32 and second shoulder portion 34 may be configured to engage adjacent crowns 22a, 22b of mini-corrugation 22. In some embodiments, first and second shoulder portions 32, 34 may span almost the entire width of the corrugation 22 thus desirably distributing the sealing force over the width of the corrugation. As shown in FIG. 2, a notch 40 is formed in second shoulder portion 34 to allow gasket 20 to adjust to forces that it may be subjected to during use. Notch 40 may be a number of different shapes, including, for example, V-shaped.

Sealing portion 30 also includes a first bonding portion 42 extending from first shoulder portion 32 and a second bonding portion 44 extending from second shoulder portion 34. First bonding portion 42 and second bonding portion 44 may be formed of the same material as gasket 20, and may provide additional surface area to bond gasket 20 to spigot portion 18. First bonding portion 42 and second bonding portion 44 may have any known shape and/or configuration. In the exemplary embodiment, first bonding portion 42 and second bonding portion 44 each have an arcuate shape.

First bonding portion 42 and second bonding portion 44 may have the same or different dimensions. In at least some embodiments, first bonding portion 42 and/or second bonding portion 44 may have a length of about 0.4652 inches and a thickness of 0.125 inches. The length of first bonding portion 42 may be a linear distance from a terminal end of first bonding portion 42 to seating portion 26, and the length of second bonding portion 44 may be a linear distance from a terminal end of second bonding portion 44 to seating portion notch 40. In some embodiments, first bonding portion 42 and/or second bonding portion 44 may have an arcuate length of about 0.5 inches. It will be understood that the dimensions of first bonding portion 42 and second bonding portion 44 may vary based on the dimensions of the second corrugated pipe section 14.

Figure 3:
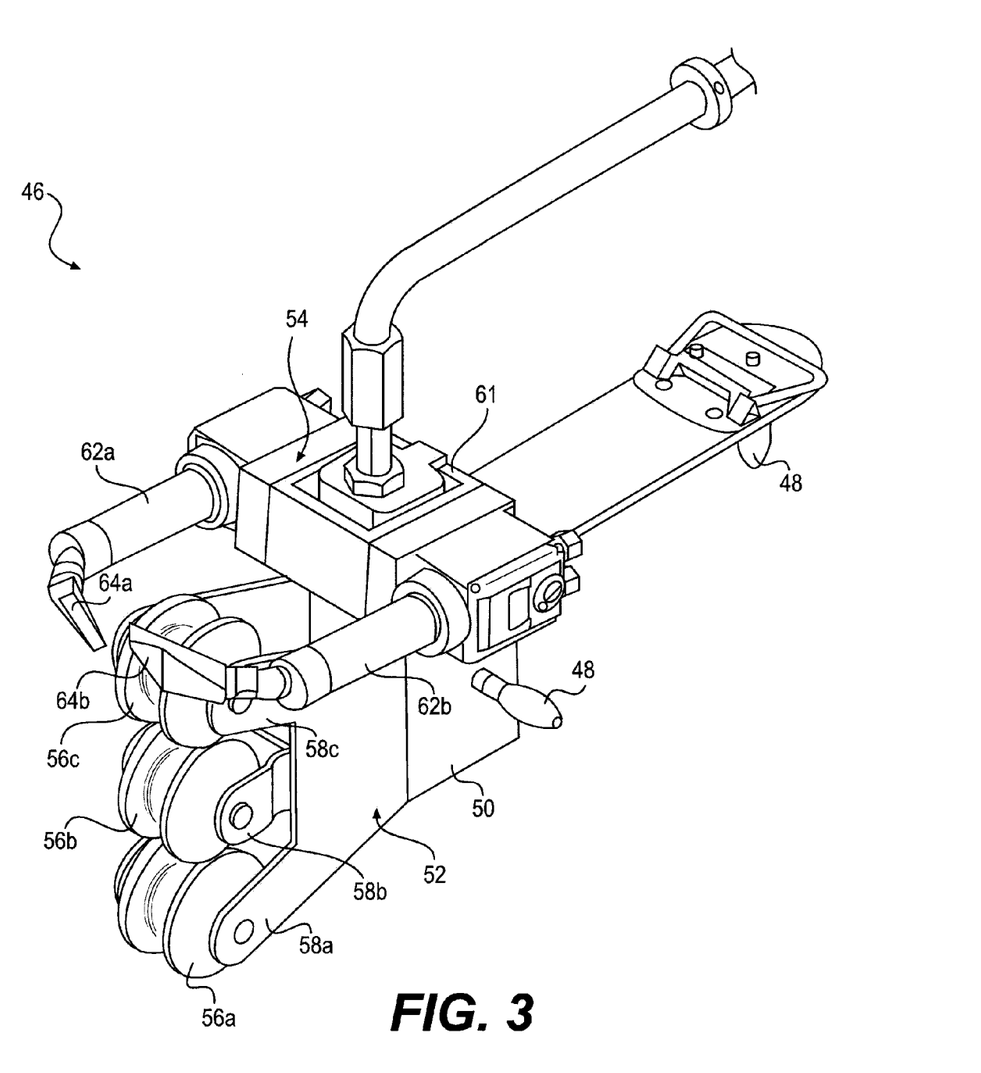
FIG. 3 is a perspective view of a handheld welding assembly.

FIG. 3 discloses an exemplary assembly 46 for welding gasket 20 to spigot portion 18. In general, assembly 46 includes a blower mount 54, a roller mount 52, and a grip housing 50. In this embodiment, assembly 46 may be a portable or handheld assembly having one or more handles 48 on grip housing 50 configured to be grasped by an operator during use.

Blower mount 54 includes a housing 61, and a first arm 62a and a second arm 62b extending from housing 61. A first blower head 64a is disposed on an end of first arm 62a and a second blower head 64b is disposed at an end of second arm 62b. While the depicted embodiment includes two blower arms and corresponding heads, it will be understood that a greater or lesser number of blower arms and heads may be provided. In the exemplary embodiment, first blower arm 62a and second blower arm 62b are symmetrically disposed about housing 61, and first blower head 62a and second blower head 62b are angled inward towards each other. In other embodiments, first blower arm 62a and second blower arm 62b may be substantially parallel. In other embodiments, each arm may be configured to move relative to body 50 to adjust the position of first blower head 64a and second blower head 64b relative to housing 50 and to each other.

Blower heads 64a and 64b may have any suitable size, shape, and/or configuration to, for example, apply heat between gasket 20 and spigot portion 18. Blower mount 54 may be connected to a source of energy such as, for example, a source of heat, to deliver highly heated air to blower arms 62a, 62b and blower heads 64a, 64b. In some embodiments, blower heads 64a, 64b may be configured to apply heat onto gasket 20 and spigot portion 18 within a temperature range of about 350° F. to 450° F.

Roller mount 52 includes one or more compression rollers 56 each rotatably mounted between arms of a clevis 58. The one or more compression rollers 56 may be arranged substantially vertically between blower arms 62a and 62b, and generally perpendicular to blower arms 62a and 62b. The one or more compression rollers 56 may have any suitable size, cross-sectional area, shape, and/or configuration to, for example, apply pressure to force two or more heated materials together. In the exemplary embodiment depicted in FIG. 3, roller mount 52 includes three compression rollers 56a, 56b, and 56c rotatably mounted on clevises 58a, 58b, and 58c, respectively. It should be understood, however, that roller mount 52 may include a greater or lesser number of compression rollers.

Figure 4:
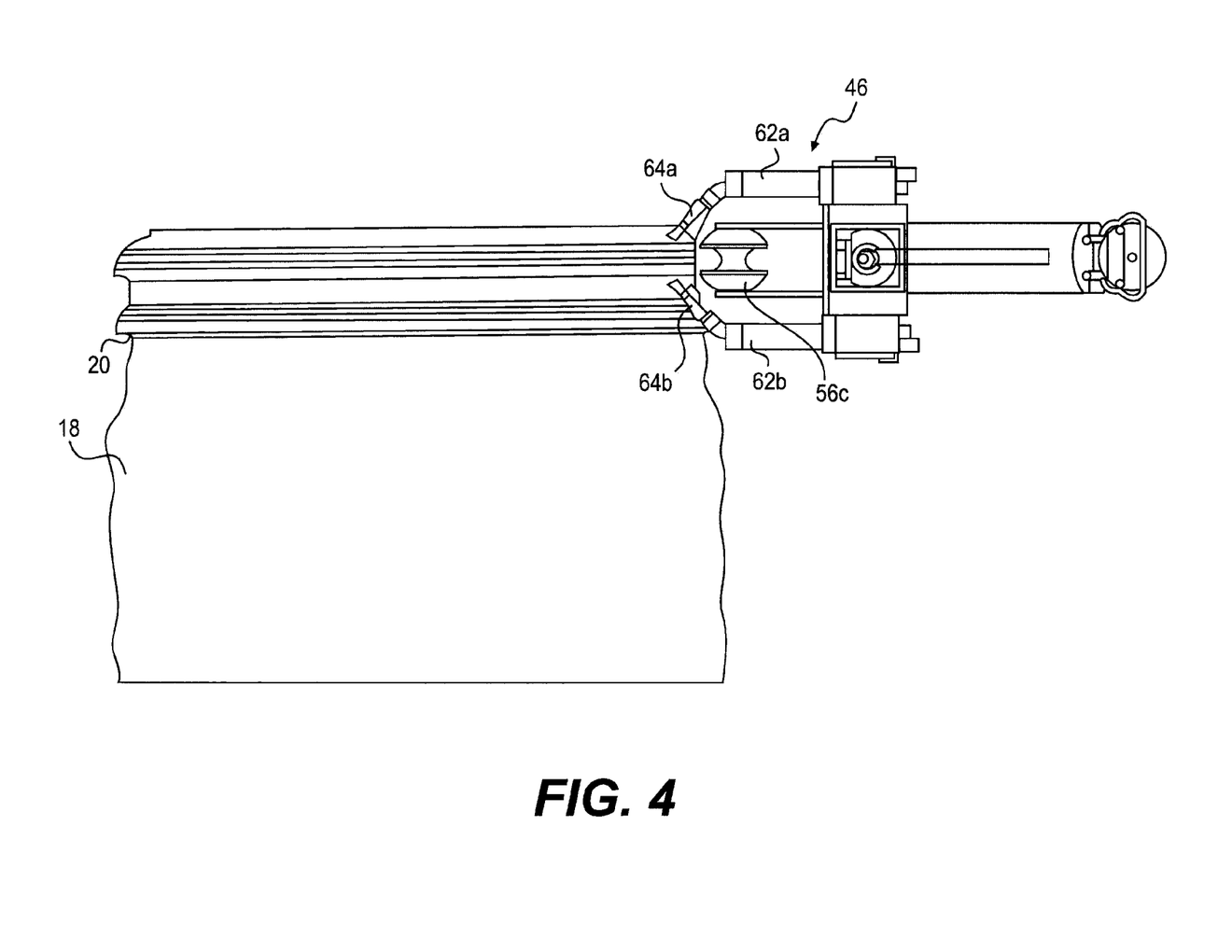
FIG. 4 is a top view of the handheld welding assembly of FIG. 3, used for welding an exemplary gasket to a spigot portion.

Referring to FIG. 4, gasket 20 may be a strip gasket that may be placed about an outer circumference of spigot portion 18. Seating portion 26 of gasket 20 may be placed in recess 24 in mini-corrugation 22 on the surface of spigot portion 18. Upon placement of gasket 20 in recess 24, first shoulder portion 42 may rest on a first crown and second shoulder portion 44 may rest on a second crown of mini-corrugation 22.

Gasket 20 may then be fused to spigot portion 18 by, for example, welding first bonding portion 42 and second bonding portion 44 to spigot portion 18. In particular, an operator may position assembly 46 adjacent gasket 20 and spigot portion 18. Heated pressurized air may be transmitted through first blower arm 62a and second blower arm 62b to first blower head 64a and second blower head 64b, respectively. First blower head 64a and second blower head 64b may be positioned relative to gasket 20 so that heat may be applied to the area between spigot portion 18 and gasket 20.

As gasket 20 and spigot portion 18 are heated, heat is conducted to first bonding portion 42 and second bonding portion 44 until first and second bonding portions 42, 44 and the surface of spigot portion 18 have sufficiently melt and mixed. In some embodiments, gasket 20 and spigot portion 18 may be heated to 350 to 450° F. It should be noted, however, that the duration and temperature of the heated air applied to gasket 20 and spigot portion 18 may be adjusted so that the melting occurs only at first bonding portion 42 and second bonding portion 44 (FIG. 2).

Compression rollers 56a, 56b, and 56c, which are adjacent blower heads 64a and 64b, may be applied to gasket 20 after gasket 20 and spigot portion 18 have been heated. Compression rollers 56a, 56b, and 56c may be configured to apply sufficient force to sealing surface 36 to force the heated materials together. In this manner, gasket 20 may be fused to spigot portion 18.

Operator may be configured to manually operate assembly 46 via the one or more handles 48 and move assembly 46 along gasket 20 about the circumference of spigot portion 18. In some embodiments, operator may continuously apply heat to the entire length of gasket 20 to weld gasket 20 to spigot portion 18. In other embodiments, assembly 46 may be used to spot weld gasket 20 to spigot portion 18. In those embodiments, welding may be concentrated at various spots between gasket 20 and spigot portion 18 about the circumference of spigot portion 18. After gasket 20 has been welded to spigot portion 18, bell portion 16 of first corrugated pipe section 12 may be mated to spigot portion 18 of second corrugated pipe section 14 to form coupling portion 10 (FIG. 1).

Figure 5A:
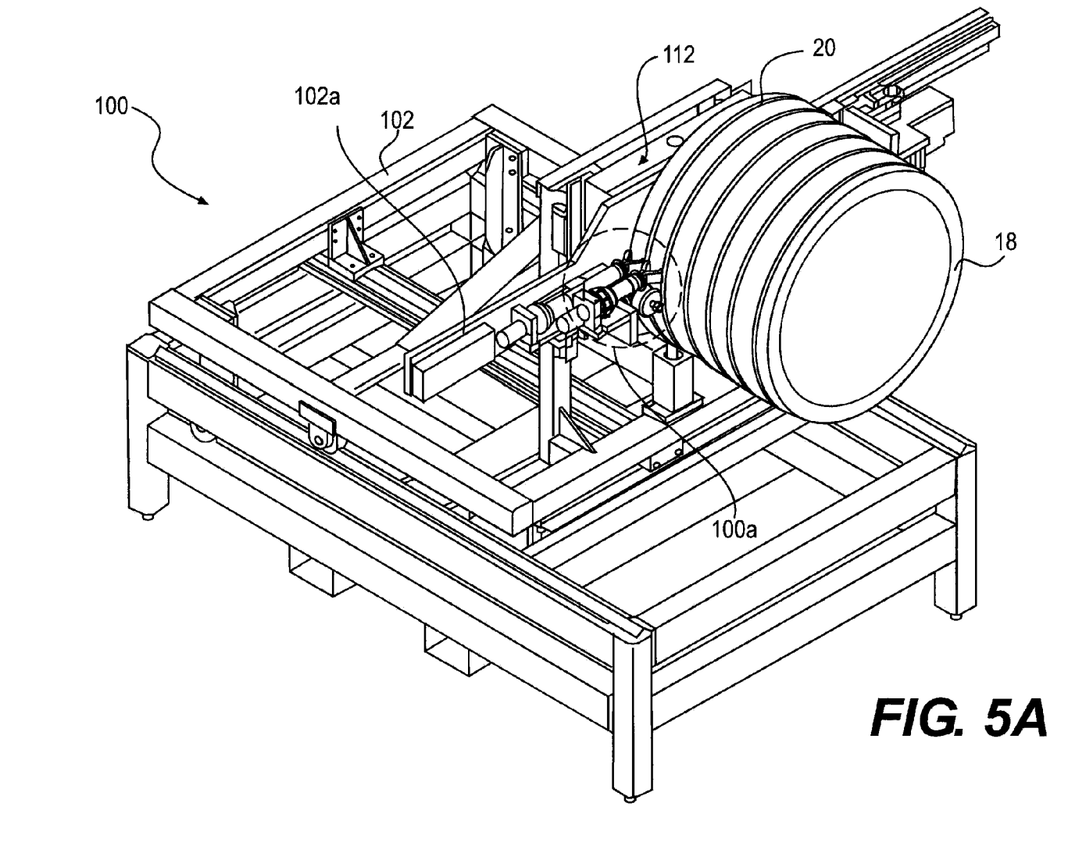
FIG. 5A is a perspective view of an automatic welding assembly used for welding an exemplary gasket to a spigot portion.
Figure 5B:
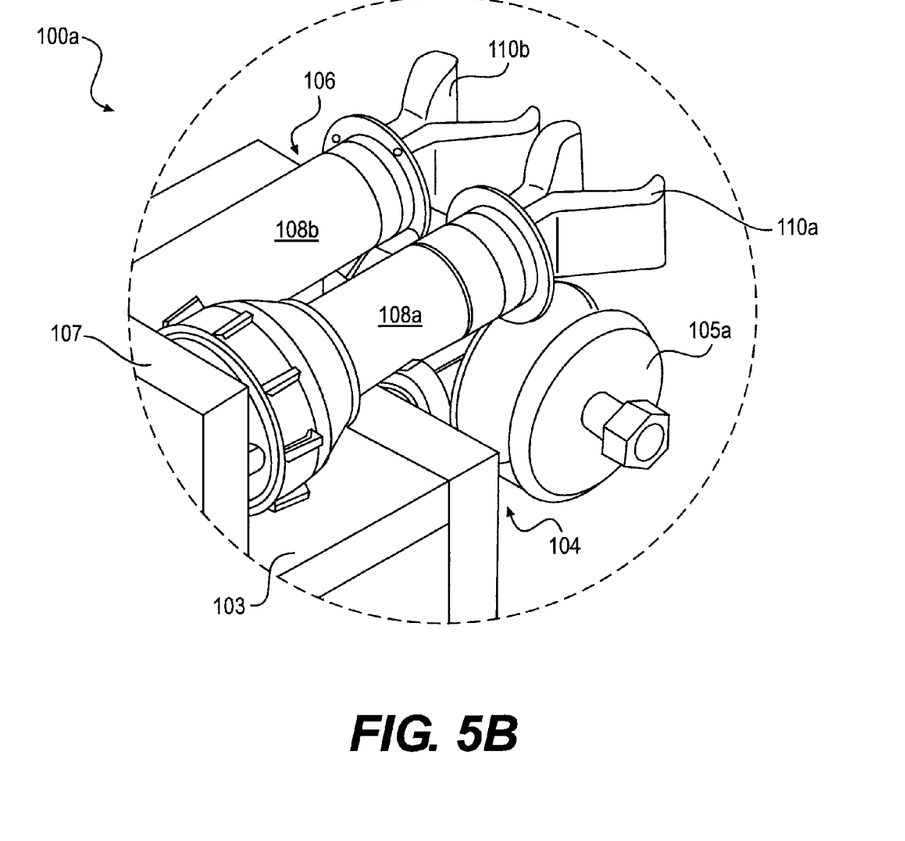
FIG. 5B is an exploded view of the automatic welding assembly of FIG. 5A.

FIGS. 5A and 5B disclose another assembly 100 for welding an exemplary gasket to a spigot portion. Assembly 100 includes a supporting structure 102, a blower mount 106, and a roller mount 104 fixed to a portion 102a of supporting structure 102. Assembly 100 further includes a rotating assembly 112 configured to rotate spigot portion 18 relative to supporting structure 102, blower mount 106, and roller mount 104, all of which remain stationary. In this embodiment, assembly 100 is an automatic welding assembly which enables the user to preset the speed at which spigot portion 18 is rotated. The speed of rotating assembly 112 may be set via a controller (not shown). In addition, rotating assembly 112 may be positioned at any other suitable location of assembly 100 to effectuate rotation of spigot portion 18 relative to supporting structure 102, blower mount 106, and roller mount 104.

Blower mount 106 includes a blower housing 107, a first blower arm 108a, and a second blower arm 108b. First blower arm 108a and second blower arm 108b may extend from blower housing 107. A first blower head 110a is disposed on an end of first arm 108a and a second blower head 110b is disposed at an end of second arm 108b. As in the embodiment described above, blower heads may have any shape, size, and/or configuration to deliver ambient or heated air to bond gasket 20 and spigot portion 18. In contrast to the embodiment described above, first arm 108a and first blower head 110a are substantially parallel to second blower arm 108b and second blower head 110b. In certain embodiments, blower mount 106 may be any appropriate heat-conducting device configured to heat gasket 20 for bonding to spigot portion 18.

Roller mount 102 includes a support 103 substantially perpendicular to blower housing 107. Roller mount 102 includes one or more compression rollers 104 mounted to support 102. In this embodiment, the one or more compression rollers 105 are horizontally arranged below blower heads 110. While one compression roller 105*a* is shown, it will be understood that two compression rollers are provided below and substantially in parallel with blower heads 110*a* and 110*b*. It is contemplated that, in some embodiments, a greater or lesser number of compression rollers may be provided.

During the pipe manufacturing process, rotating assembly 112 may be configured to rotate spigot portion 18 relative to supporting structure 102 at a speed set by a controller. Heating pressurized air may be delivered through first arm 108*a* and second arm 108*b* to first blower head 110*a* and second blower head 110*b*, respectively. First blower head 110*a* may be positioned relative to a first gasket 20, and second blower head 110*b* may be positioned relative to a second gasket 20, so that heat may be applied to the area between spigot portion 18 and the first and second gaskets 20. As the first and second gaskets 20 and spigot portion 18 are heated, heat is conducted to first bonding portion 42 and second bonding portion 44 to bond first and second bonding portions 42, 44 to spigot portion 18. As spigot portion 18 rotates, the one or more compression rollers 105 may be configured to apply sufficient force to sealing surface 36 of each of the first and second gaskets 20 to force the heated materials together. In this manner, the first and second gaskets 20 may be fused to spigot portion 18. And accordingly, assembly 100 may be configured to weld multiple gaskets 20 to spigot portion 18.

Figure 6:
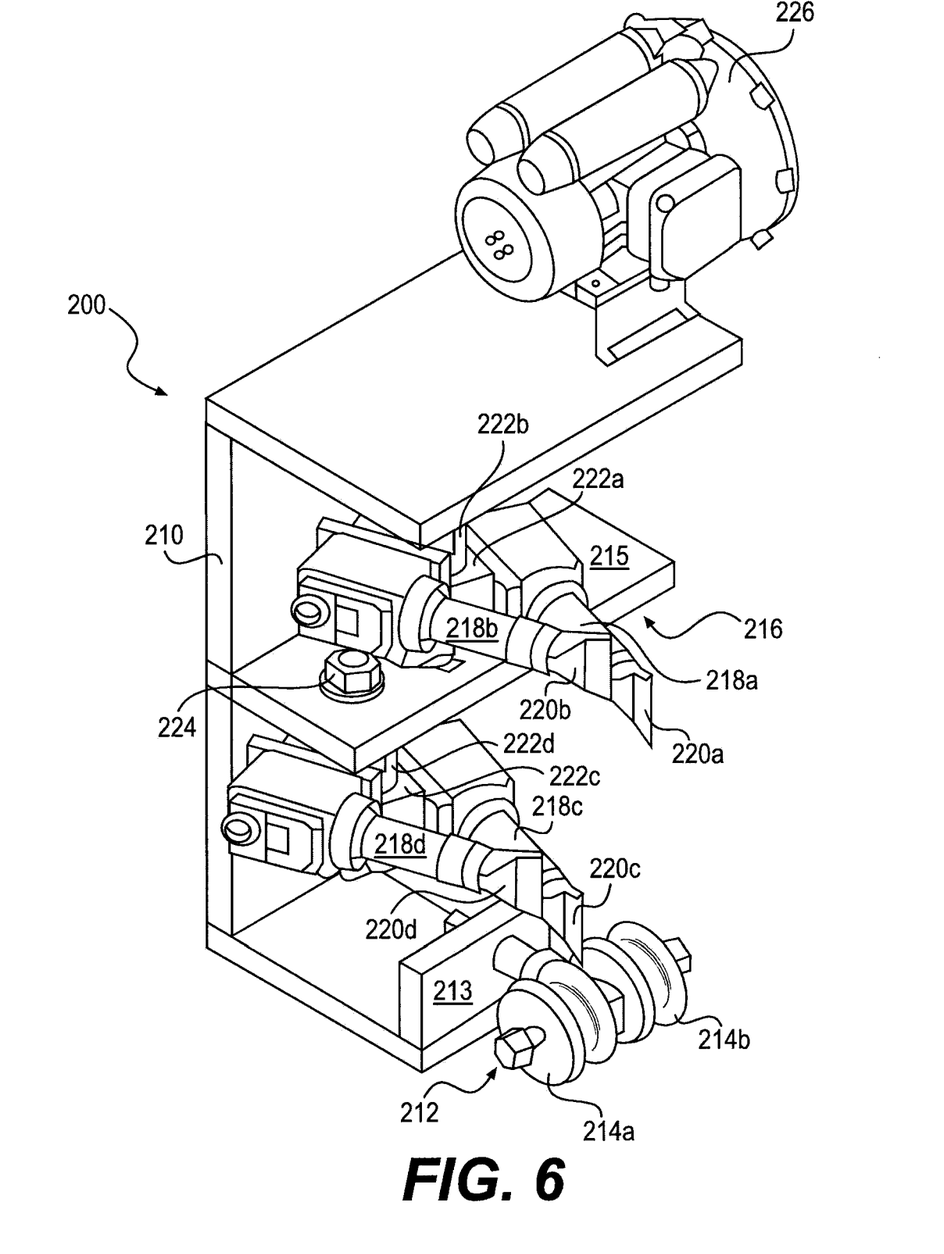
FIG. 6 is a perspective view of an alternative embodiment of the automatic welding assembly of FIG. 5A.

FIG. 6 is a perspective view of another alternative embodiment of an automatic welding assembly 200. Assembly 200 includes a supporting structure 210, a roller mount 212, and a blower mount 216. As in the embodiment discussed above, roller mount 212 includes a support 213 and two compression rollers 214*a*, 214*b* mounted to support 213. In this embodiment, however, blower mount 216 includes a platform 215 and a plurality of blower arms 218 pivotably attached to platform 215. Blower arms 218 may be configured to adjust the position of blower heads 220 for spigot portions of varying diameters.

As shown in FIG. 6, assembly 200 includes a first blower arm 218*a* having a first coupling portion 222*a* disposed at one end and a first blower head 220*a* disposed at an opposing end, and a second blower arm 218*b* having a second coupling portion 222*b* disposed at one end and a second blower head 220*b* disposed at an opposing end. First coupling portion 222*a* of first blower arm 218*a* and second coupling portion 222*b* of second blower arm 218*b* are pivotably coupled to platform 215 via a screw (not shown).

Assembly 200 further includes a third blower arm 218*c* having a third coupling portion 222*c* disposed at one end and a third blower head 220*c* disposed at an opposing end, and a fourth blower arm 218*d* having a fourth coupling portion 222*d* disposed at one end and a fourth blower head 220*d* disposed at an opposing end. Third coupling portion 222*c* of third blower arm 218*c* and fourth coupling portion 222*d* of fourth blower arm 218*d* are pivotably coupled to platform 215 via a screw 224.

By this arrangement, each blower arm may be adjustable. In particular, each blower arm 218 may be configured to move relative to supporting structure 210 and each other. For example, each blower arm 218 may be configured to pivot relative to supporting structure 210 so that a corresponding blower head 220 moves toward or away from an adjacent blower head 220. As alluded to above, first, second, third, and fourth blower arms 220*a*, 220*b*, 220*c*, 220*d* may be configured to deliver ambient or heated air. In other embodiments, any of first, second, third, and fourth blower arms 220*a*, 220*b*, 220*c*, 220*d* may be any appropriate heat-conducting device. As shown in FIG. 6, assembly 200 may further include a blower assembly 226 for delivery ambient or heated air to one or more gaskets 20 and spigot portion 18.

Figure 7:
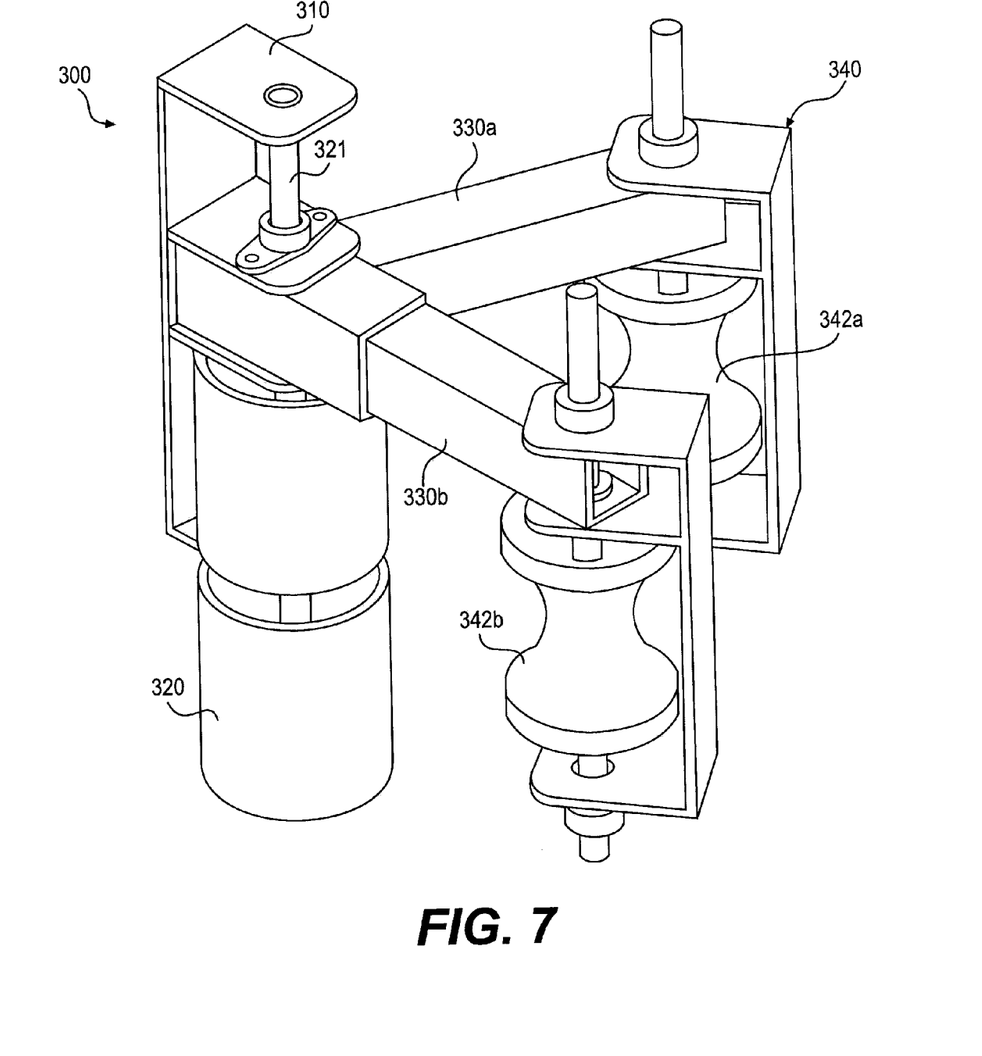
FIG. 7 is a perspective view of a second alternative embodiment of the automatic welding assembly of FIG. 5A.
Figure 8:
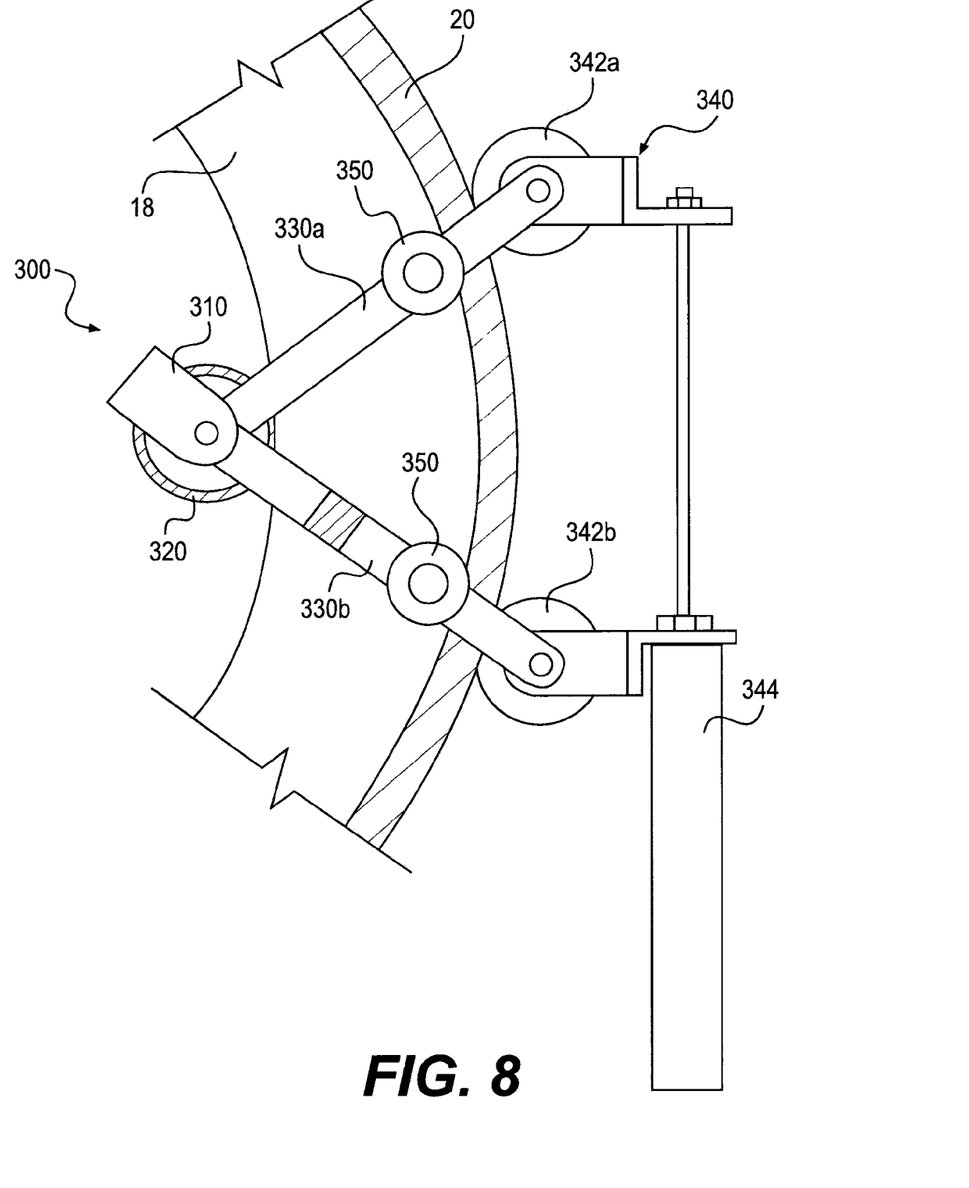
FIG. 8 is a top view of the automatic welding assembly of FIG. 7, for use welding an exemplary gasket to a spigot portion.

FIG. 7 discloses another alternative embodiment of an automatic welding assembly. Assembly 300 includes a supporting structure 310, a drive roller 320, a roller mount 340, and one or more swing arms 330 to pivotably attach roller mount 320 to supporting structure 310. In some embodiments, assembly 300 may further include a blower mount 350 attached to swing arms 330 (FIG. 8). Blower mount 350 may be configured to deliver ambient or heated air to gasket 20 and spigot portion 18. In this embodiment, the automatic welding assembly may be configured to bond gasket 20 to spigot portion 18 by applying pressure to an interior and exterior surface of spigot portion 18.

As shown in FIG. 7, drive roller 320 is coupled to supporting structure 310 via shaft 321. Drive roller 320 may have any known size and/or configuration to be placed in an interior of spigot portion 18. Drive roller 320 may be driven in rotation by an electric motor (not shown) coupled to support structure 310.

Roller mount 340 may be pivotally coupled to drive roller 320 via swing arms 330. The number of swing arms 330 may correspond to the number of compression rollers 342 of roller mount 340. In the exemplary embodiment, roller mount 340 includes two compression rollers 342*a*, 342*b* each pivotally coupled to driver roller 320 via swing arms 330*a*, 330*b*. Compression rollers 342*a*, 342*b* may have any size, shape, and/or configuration to, for example, apply force to heated materials. As shown in FIG. 8, compression rollers 342*a*, 342*b* may be coupled by a pneumatic ram 344.

During pipe manufacturing, drive roller 320 may be placed in an interior of spigot portion 18 and compression rollers 342*a*, 342*b* may be placed on sealing surface 26 of gasket 20. One or more blower mounts 350 (FIG. 8) may be mounted on swing arms 330*a*, 330*b*, and may be configured to apply heat to gasket 20 and spigot portion 18. Immediately following, compression rollers 342*a*, 342*b* may be applied to the heated area. In particular, the pneumatic ram 344 may be configured to exert a force on roller mount 340. In doing so, driver roller 320 may be pulled against an interior of spigot portion 18 to exert pressure on the interior surface of spigot portion 18. Further, pressure may be applied to compression rollers 342*a*, 342*b* to exert a force on gasket 20 to force the heated materials together.

Other methods of welding gasket 20 to spigot portion 18 are contemplated. For example, in some embodiments, gasket 20 may be fused to spigot portion 18 using a heated roller or hot plate gasket stretcher. In other embodiments, gasket 20 may be welded using fusion or ultrasonic welders. In yet other embodiments, gasket 20 may be extruded directly onto spigot portion 18. And in other embodiments, molten plastic may be extruded onto spigot portion 18 and gasket 20 to fuse gasket 20 to spigot portion 18. Furthermore, although FIG. 3 illustrates roller mount 52 including a plurality of compression rollers 56 arranged in series for applying compression to a single gasket 20 to fuse gasket 20 to spigot portion 18, it should be appreciated that in other embodiments, assembly 46 may include one or more additional roller mounts 52 arranged in parallel to assist the fusing of a plurality of gaskets 20 to spigot portion 18. It should also be appreciated that assembly 300 of FIGS. 7 and 8 may include one more additional drive rollers 320 and roller mounts 340 arranged in parallel to assist fusing of a plurality of gaskets 20 to spigot portion 18. Moreover, it should be appreciated that assembly 200 may include one or more additional compression rollers 214a and 214b arranged in series, similar to the arrangement of rollers 56 in FIG. 3, to further assist the fusing of gaskets 20 to spigot portion 18.

Advantages of the present methods and assemblies for welding a gasket onto a spigot may include structurally reinforcing the gasket to a spigot portion such that during handling, storing, shipping, and installation, the gasket portion may be less likely to be removed from the spigot portion. Additionally, the disclosed methods may obstruct the ability of dirt, rock, or other debris from penetrating under the gasket, which could affect the sealing ability of the product.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A method of welding a gasket to a spigot portion of a pipe section, the method comprising:
   supporting the gasket in a recess on the spigot portion of the pipe section, wherein the gasket includes:
      a seating portion extending radially and dimensioned to fit within an annular recess in the spigot portion;
      a sealing portion including a first shoulder portion axially extending from one side of the seating portion and a second shoulder portion extending from the other side of the seating portion, the first and second shoulder portions being configured to engage the spigot portion on axially opposite sides; and
      a first bonding portion extending from the first shoulder portion and a second bonding portion extending from the second shoulder portion, wherein the first and second bonding portions are provided to bond the gasket to the spigot portion;
   heating a portion of the gasket and an adjacent surface of the spigot portion; and
   applying a force onto the portion of the gasket following the application of heat to fuse the gasket onto the spigot portion.

2. The method of claim 1, wherein heating the portion of the gasket and the adjacent surface of the spigot portion includes melting at least the first bonding portion, the second bonding portion, and adjacent surfaces of the spigot portion.

3. The method of claim 1, wherein the applying force onto the portion of the gasket includes applying one or more compression rollers onto a sealing surface of the sealing portion of the gasket.

4. The method of claim 3, wherein applying one or more compression rollers includes applying three compression rollers.

5. The method of claim 1, wherein the gasket is a strip gasket.

6. The method of claim 1, further including continuously heating the gasket and the spigot portion along a length of the gasket.

7. The method of claim 5, further including heating the gasket at various spots along a circumference of the spigot portion.

8. A method of manufacturing a pipe assembly, wherein the pipe assembly includes a first corrugated pipe section having a bell portion, a second corrugated pipe section having a spigot portion, and a gasket configured to seal the spigot portion within the bell portion, the method comprising:
   supporting the gasket in a recess on the spigot portion of the pipe section, wherein the gasket includes:
      a seating portion extending radially and dimensioned to fit within an annular recess in the spigot portion;
      a sealing portion including a first shoulder portion axially extending from one side of the seating portion and a second shoulder portion extending from the other side of the seating portion, the first and second shoulder portions being configured to engage the spigot portion on axially opposite sides; and
      a first bonding portion extending from the first shoulder portion and a second bonding portion extending from the second shoulder portion, wherein the first bonding portion and the second bonding portion are provided to bond the gasket to the spigot portion;
   directing heat onto a portion of the gasket and an adjacent surface of the spigot portion; and
   applying pressure to the portion of the gasket to fuse the portion of the gasket to the adjacent surface of the spigot portion.

9. The method of claim 8, further including providing a welding assembly including one or more blower heads positioned adjacent one or more compression rollers.

10. The method of claim 9, wherein the one or more blower heads are configured to apply heat to the gasket and spigot portion.

11. The method of claim 9, wherein the welding assembly includes three compression rollers.

12. The method of claim 9, wherein the welding assembly is handheld.

13. The method of claim 9, wherein the welding assembly is automatic.

14. The method of claim 8, further including rotating the spigot portion while directing heat onto the portion of the gasket.

15. The method of claim 8, further including melting at least the first bonding portion, the second bonding portion, and adjacent surfaces of the spigot portion.

16. The method of claim 8, further including applying pressure to the surface of the gasket immediately following the step of melting the first bonding portion, the second bonding portion, and adjacent surfaces of the spigot portion.

* * * * *